United States Patent
Duan et al.

(10) Patent No.: US 7,529,049 B2
(45) Date of Patent: May 5, 2009

(54) METHOD AND SYSTEM FOR TESTING OF MAGNETIC DISKS USING F-BER

(75) Inventors: Shanlin Duan, Fremont, CA (US); Zhupei Shi, San Jose, CA (US); Li Tang, Fremont, CA (US); Jane Jie Zhang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 138 days.

(21) Appl. No.: 11/515,164

(22) Filed: Sep. 1, 2006

(65) Prior Publication Data
US 2008/0062549 A1 Mar. 13, 2008

(51) Int. Cl.
G11B 27/36 (2006.01)

(52) U.S. Cl. .......................... 360/31; 360/53

(58) Field of Classification Search .......... None
See application file for complete search history.

(56) References Cited

U.S. PATENT DOCUMENTS

| | | | |
|---|---|---|---|
| 4,394,695 A | 7/1983 | Mahon | |
| 4,574,234 A | 3/1986 | Inbar | |
| 4,578,721 A | 3/1986 | Brannan, Jr. | |
| 5,121,263 A | 6/1992 | Kerwin et al. | |
| 5,355,261 A | 10/1994 | Taratorin | |
| 5,490,091 A | 2/1996 | Kogan et al. | |
| 5,737,519 A | 4/1998 | Abdelnour et al. | |
| 5,754,353 A | 5/1998 | Behrens et al. | |
| 5,818,655 A | 10/1998 | Satoh et al. | |
| 6,157,507 A | 12/2000 | Korenari et al. | |
| 6,292,912 B1 | 9/2001 | Cloke et al. | |
| 6,442,730 B1 | 8/2002 | Schachner et al. | |
| 6,735,724 B1 | 5/2004 | McClellan | |
| 2003/0067697 A1 | 4/2003 | Weinstein et al. | |
| 2004/0075952 A1* | 4/2004 | Takeo | 360/313 |
| 2007/0230000 A1* | 10/2007 | Alex et al. | 360/31 |

OTHER PUBLICATIONS

Chen et al., "Detection Signal-to-Noise Ratio Versus Bit Cell Aspect Bit Cell Aspect Ratio at High Areal Densities," IEEE Trans. MAG 37, No. 3, pp. 1157-1167, May 2001.
Taratorin et al., "Media Noise, Nonlinear Distortions, and Thermal Stability in High Density Recording," IEEE Trans. MAG 36, No. 1, pp. 80-85, Jan. 2000.
Fitzpatrick et al., "The Relationship of Medium Noise to System Eror Rate in a PRML Channel," IEEE Trans. MAG 30, No. 6, pp. 3990-3995, Nov. 1994.
Sobey et al., "A Drive-Level Error Rate Model for Component Design and System Evaluation," IEEE Trans. MAG 30, No. 2, pp. 269-274, Mar. 1994.
Arnoldussen, "Bit Cell Aspect Ration: An SNR and Detection Perspective," IEEE Trans. MAG 34, No. 4, pp. 1851-1853, Jul. 1998.

* cited by examiner

*Primary Examiner*—Jason C Olson
(74) *Attorney, Agent, or Firm*—Zilka-Kotab, PC

(57) ABSTRACT

Spinstand test improvement that measures Functional Byte Error Rate (F-BER) of a disk. The F-BER is correlated to the BER of a disk. The F-BER test is faster than a BER test. The F-BER test is incorporated into a spinstand tester or the software associated with a spinstand tester.

17 Claims, 6 Drawing Sheets

FIG. 1A

| Wafer name | Type 1 | | | | | | | | | | | |
|---|---|---|---|---|---|---|---|---|---|---|---|---|
| Type | Bottom head | | | | | | | | | | | |
| Sample Size | 5 heads/2 surfaces | | | | | | | | | | | |
| Disk ID | 1 | | | 2 | | | 3 | | | 4 | | |
| A/B | 1A | 1B | ave. | 1A | 1B | ave. | 1A | 1B | ave. | 1A | 1B | ave. |
| (Byte/Bit)ER | -7.61 | -7.64 | -7.63 | -7.89 | -7.83 | -7.86 | -7.92 | -8.01 | -7.97 | -7.75 | -7.76 | -7.76 |
| SpectralSNR(dB) | 16.9 | 16.6 | 16.74 | 17.0 | 16.9 | 16.98 | 17.2 | 17.0 | 17.10 | 16.6 | 16.6 | 16.6 |

```
F-BER Module: Subroutine written in Microsoft Virtual Basic

Sub FBER(PW50, LFTAA, Freq, Nm, Nhe, BER)

Const pi = 3.1415926
Dim PW50#, LFTAA#, Freq#, Nm#, Nhe#
Dim T#, BW#, CSNR#, Signal#, FOM0#, FOM1#, noise_he#, UBD#
Dim BER#

T = 1#/ Freq
BW = 1#/ (2*T)
Signal = LFTAA / 2#
FOM0 = (PW50 / T) * power(Signal / Nm, 2)
noise_he = Nhe*power(BW, 0.5)
UBD = power((CPW50 / T - 1.935), 2)
FOM1 = power(Signal/noise_he, 2) / (10.88 + 6.56* UBD)
CSNR = power((4.7452 /pi/FOM0 + 0.65685/FOM1), -0.5)
BER = 0.5* (1 - erf(0.5*CSNR))

End Sub
```

METHOD AND SYSTEM FOR TESTING OF MAGNETIC DISKS USING F-BER

BACKGROUND OF THE INVENTION

Areal density improvements have been a main driving force in the progress of magnetic recording technology. Typically, disks (media) in each new disk drive product have a higher signal to noise ratio and the ability to record sharper magnetic transitions than that of previous products. Even a small improvement in signal to noise ratio may significantly impact the recording performance and therefore the areal density of the media.

Currently, magnetic media evaluation is generally executed by spin-stand tester systems during the media development cycle. The parametric data tested includes overwrite (OW), half-peak pulse width (PW50), track average amplitude (TAA), DC erased signal to noise ratio (DCSNR), spectrum signal to noise ratio (SpSNR), 4TSNR, 2TSNR, 1TSNR, where 1T stands for bit period of written data at high frequency and 4T means ¼ high frequency and SNR stands for signal to noise ratio. This data is generally measured for each disk and then ranked for media design optimization.

However, it is often the case that media ranked based on these parametric data is not well correlated with hard disk drive (HDD) file data. The most critical parameter in HDD file data is byte error rate (BER). As shown in FIGS. 1A and 1B, the BER of a series disk does not correlate well with media component test parameters, in this case SpSNR. Thus, a bit error rate test is needed to more fully evaluate the media. There are many varieties of BER tests that have been proposed.

U.S. Pat. No. 6,157,507 describes a performance evaluation method of linking PW50 and SNR to the BER via equation (2) in column 1 and equation (1) in column 4 of the patent. The relationship between BER and SNR is illustrated in FIG. 9 of the patent. For the disk media used in high density (>100 Gb/in2) and high data rate (>500 Mb/s) applications, the performance evaluation method and the described simplified relationship between BER and SNR in this prior art are not as accurate for testing these more modern disk drives. The present invention advantageously uses a more accurate alternate to SNR to determine the BER.

U.S. Pat. Nos. 5,490,091 and 5,355,261 constructs an algorithm for a partial response maximum likelihood (PRML) data detection channel. This algorithm allows BER to be directly measured. This patent describes PRML chip design and the method for making a PRML integrated circuit (IC) chip for applications in magnetic data storage systems. A PRML chip is a hardware component in a hard disk drive. The present invention is advantageously designed to test a disk drive faster than a device using a PRML chip.

U.S. Pat. No. 5,121,263 illustrates an algorithm for a PRML data detection channel to directly measure BER. The patent describes a BER evaluation for component-level disk media testing without using an extra hardware.

The BER tests of the current art have many drawbacks. Current BER tests are usually time consuming since they usually use more than 5 head gimble assemblies (HGA) to test the same disk media surface. The average result of these HGA is defined as the BER for this specific surface. An example is shown in the FIG. 1A, where 5 heads are used, and their average BER value is referred as BER for the disk surface e.g. BER=−7.61 for surface A of disk ID 9312k. The tests are time consuming, taking as much as seven minutes, for a variety of reasons. First, the tests include writing millions of transitions with a variety of bit patterns, and then reading them back while counting the number of error occurrences. Second, it requires a read channel chip optimization to perform the BER tests. The data channel optimization involves complex procedures such as read/writer interface, read interface timing, sector format, servo interface and circuit description, register bit description, detector polynomial control, AE write gate control, servo sequence control, dibit transfer count, read gate timing loop control, and equalization etc.

Other limitations of current BER tests also exist. For instance, a further limitation of the BER test is that accuracy of BER data is strongly dependent on head stability. This dependency may provide false disk media BER results due to head degradation. In addition head crashes and degradation may adversely affect BER test results. Lastly, BER data is often not correlated well with SNR measurement. Therefore, a new testing method for media performance that is accurate and cost effective is needed.

SUMMARY OF THE INVENTION

Disclosed is a magnetic test module running on a spinstand tester to measure magnetic parametric data and then construct a functional BER (F-BER) to rank and evaluate magnetic media. The method gathers PW50, signal at low frequency (LF TAA), media noise ($N_m$), head and electronic noise ($N_{he}$), and band width (BW) to determine F-BER. Further the F-BER test uses the ideal simulated $E^2$PRML channel, which mimics an optimized real channel with parametric data as input. After data collection, a correlation is established between F-BER and BER. Then F-BER of each disk is employed to rank the disk media.

The data gathered by the new test takes under one minute to collect. This is a reduction of more than six minutes from the normal BER collection rate of seven minutes. Therefore the under one minute F-BER test allows for higher throughput of media testing procedures and for a potential backlog in the disk test procedure to be reduced. Further, the method allows for more immediate insights into the interplay of different magnetic system parameters before performing time consuming and low through-put BER measurement.

For a fuller understanding of the nature and advantages of the present invention, reference should be made to the following detailed description taken together with the accompanying figures.

BRIEF DESCRIPTION OF THE DRAWINGS

FIG. 1A is a chart of BER and SpSNR for several disks.

DETAILED DESCRIPTION OF THE INVENTION

A system and method for determining the F-BER and BER of a disk is described herein. The system and method may be implemented with components or modules. The components and modules may include hardware (including electronic and/or computer circuitry), firmware and/or software (collectively referred to herein as "logic"). A component or module can be implemented to capture any of the logic described herein. The F-BER is a method for understanding and determining the BER of a disk by analyzing parametric data of a disk based on an idealized $E^2$PRML channel. The F-BER projects the error rate performance of a recording system.

Figure 6:
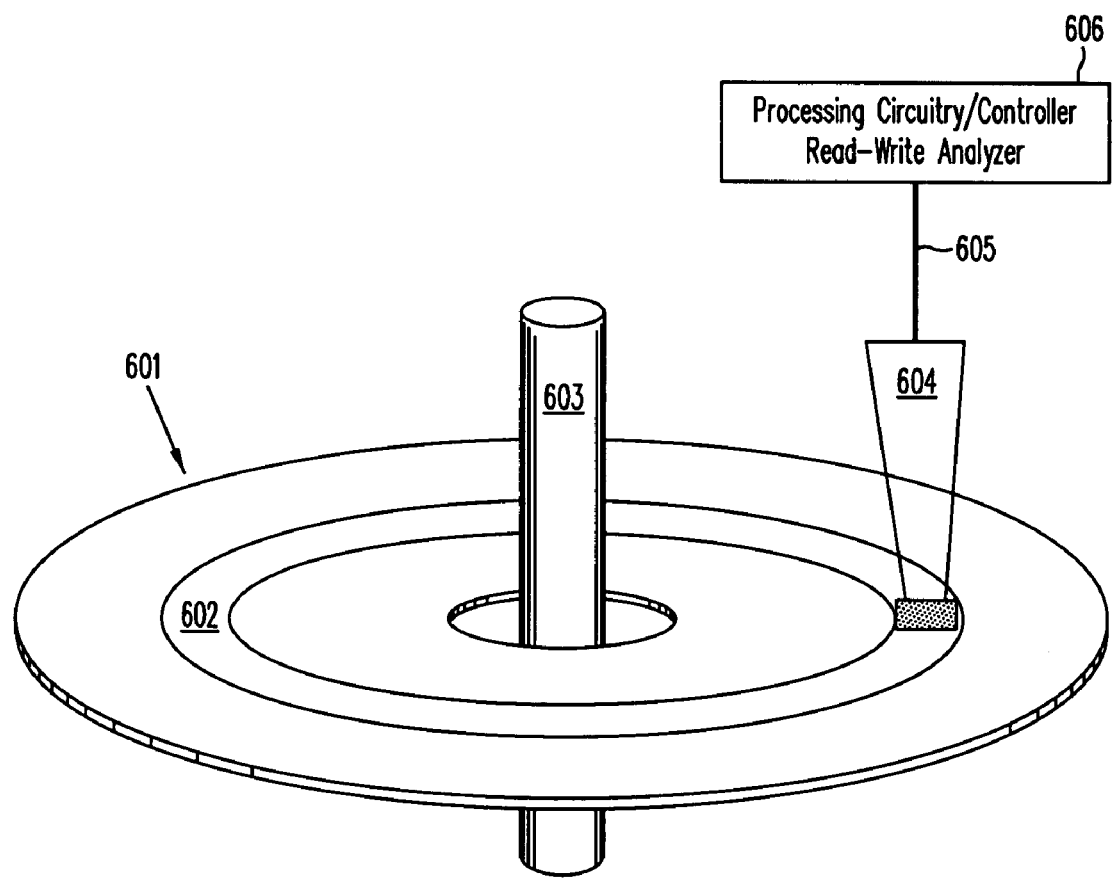
FIG. 6 is a diagram of a spin-stand tester.

FIG. 6 is a diagram of a spin-stand tester testing a piece of media. The media 601 is placed on the spin stand tester and is rotated by spindle 603. The arm and head 604 are attached to a process circuitry controller and read write analyzer (PC-CRWA) 606 by wire or wires 605. The head includes a sensor and a writer that is positioned over a track 602 to test the media. The readings and signals registered by the head are then passed to the PCCRWA to be analyzed.

During testing, data including read back signals, used to determine F-BER is collected by a module such as PCCRWA. The F-BER data to determine F-BER includes PW50, signal at low frequency (LF TAA), media noise $N_m$, head and electronic noise ($N_{he}$), band width. Further the F-BER test uses an ideal $E^2$PRML channel, which mimics an optimized real channel with parametric data as input. This data is then provided to a computer to determine the F-BER. Specifically, in addition to typical spin-stand operation, the method calls for adding a head unload operation to obtain head and electronic noise. In this way, one can separate the media noise from total noise by subtracting the head and electronic noise.

The method for determining the F-BER of a longitudinal disk is as follows and may be performed by a module to determine F-BER. Such a module includes a data processing device that receives F-BER data as described above. The data processing device then determines BW. From BW and the other data, FOM0 and FOM1 may be calculated. The FOM0 and FOM1 calculations are used to determine CSNR. In turn, ψ is determined from CSNR. Finally, the F-BER is determined from ψ. These steps are described in equations (1)-(6).

$$FOM_0 = (S_0/N_m)^2/(PW50/T) \qquad (1)$$

$$FOM_1 = \frac{[S_0/(N_m * \sqrt{BW})^2]}{a + b*[(PW50/T) - c]^2} \qquad (2)$$

$$BW = 1/(2T) \qquad (3)$$

$$CSNR = 1/\sqrt{d/\pi/FOM_0 + e/FOM_1} \qquad (4)$$

$$\psi = 0.5 * CSNR \qquad (5)$$

$$FBER = 0.5 * [1 - erf(\psi)] \qquad (6)$$

where:

$N_m$ is the media noise at 2T frequency;
$N_{he}$ is the head & electronic noise (rms noise per root Hz); and
$S_0$ is LF TAA/2.

The parameters of a, b, c, d, e in equations (1)-(6) are determined from an $E^2$PRML channel. a is preferably 10.8 and ranges from 10 to 12; b is preferably 6.56 and ranges from 6 to 7; c is preferably 1.935 and ranges from 1.75 to 2.25; d is preferably 4.7452 and ranges from 4.5 to 5; e is preferably 0.65685 and ranges from 0.4 to 0.8.

In addition, two extensions to the algorithm allow F-BER to be calculated for a perpendicular disk. The first extension is to measure the T50 of the perpendicular disk on a spinstand. The readback signal from perpendicular media is a square-type waveform. The transition width of a written bit on perpendicular media is called T50, which defines the signal range from 25% to 75% of peak value. From this test, PW50 can be obtained with the use of equation (7).

$$PW50 = 2.77 \times T50, \qquad (7)$$

The PW50 value is then incorporated in the F-BER module via the math conversion of equation (7).

The second possible extension is to add hardware into the spinstand to perform waveform differential. The waveform differentiator allows PW50 of the perpendicular recording to be directly measured.

The method for determining F-BER can be constructed based on $E^2$PRML equalization. Equalization forms generally are described in "Bit Cell Aspect Ratio: An SNR and Detection Perspective", T. C. Amoldussen, IEEE Trans. Magn. Vol. 34, pp1851-1853 (1998).

The F-BER method can be a module of a program to perform media testing. Further the F-BER module can be embedded in a spinstand or outside a spinstand. In addition, the module can be made part of a suite or GUI designed to test media as shown in FIG. 2.

FIGS. 3A, 3B, 4A and 4B show charts and graphs demonstrating the F-BER method applied to two separate disk drives. As can be seen from the graphs, the F-BER data correlates well with the BER data. Thus F-BER is an effective way of quickly estimating the BER of a media.

Figure 1B:
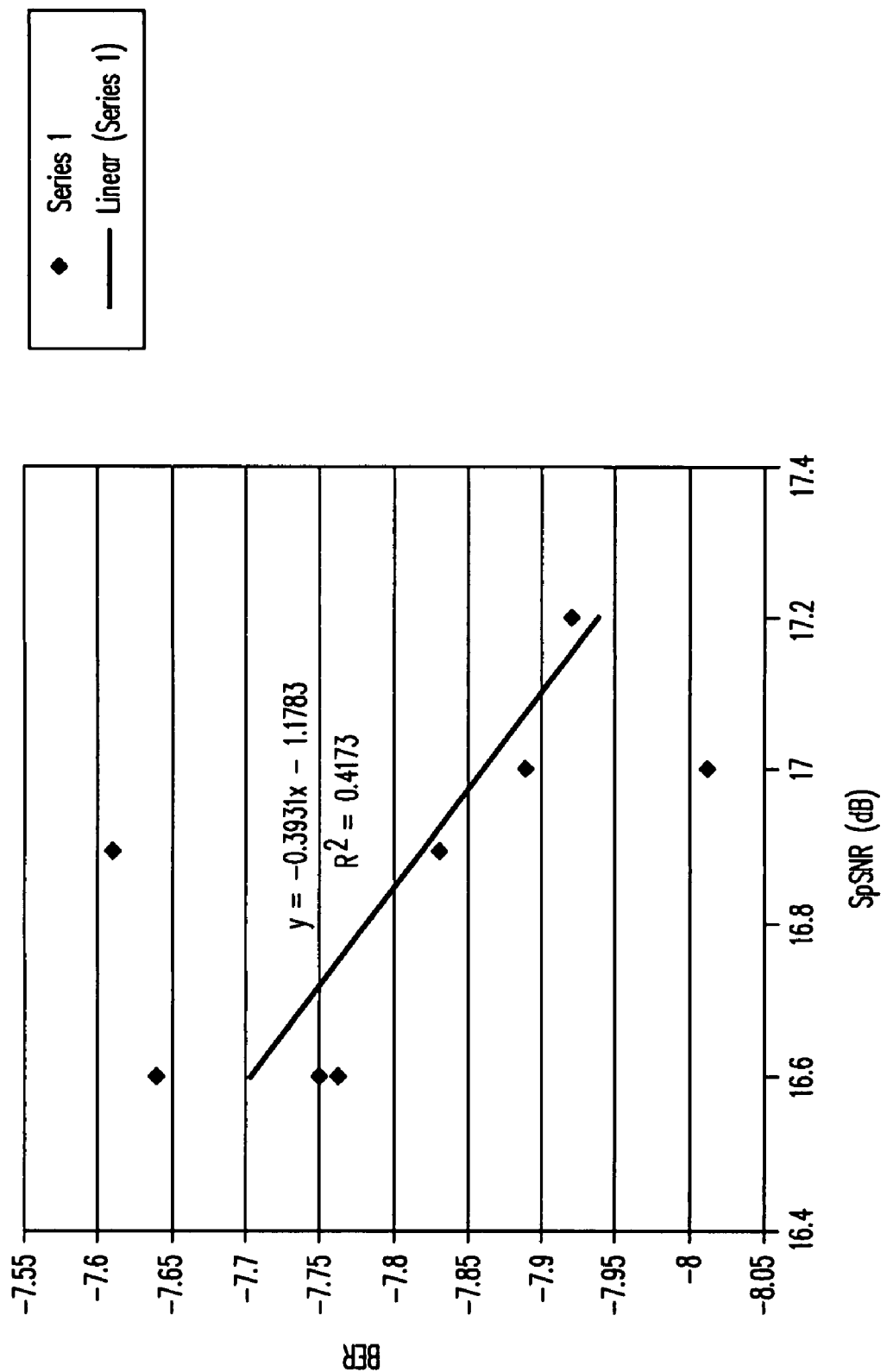
FIG. 1B is a graph of the correlation between BER and SpSNR for the disks described in FIG. 1A.
Figures 2, 5:
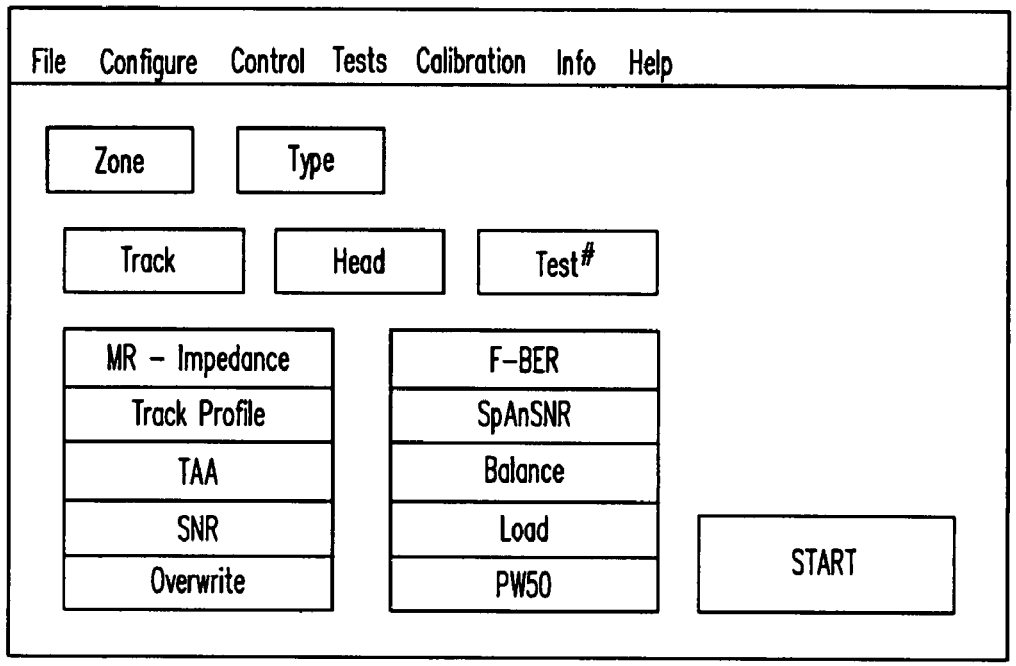
FIG. 2 is a GUI used to implement execution of the F-BER algorithm.
FIG. 5 shows an exemplary code module in Visual basic to implement the F-BER algorithm.
Figures 3A, 3B:
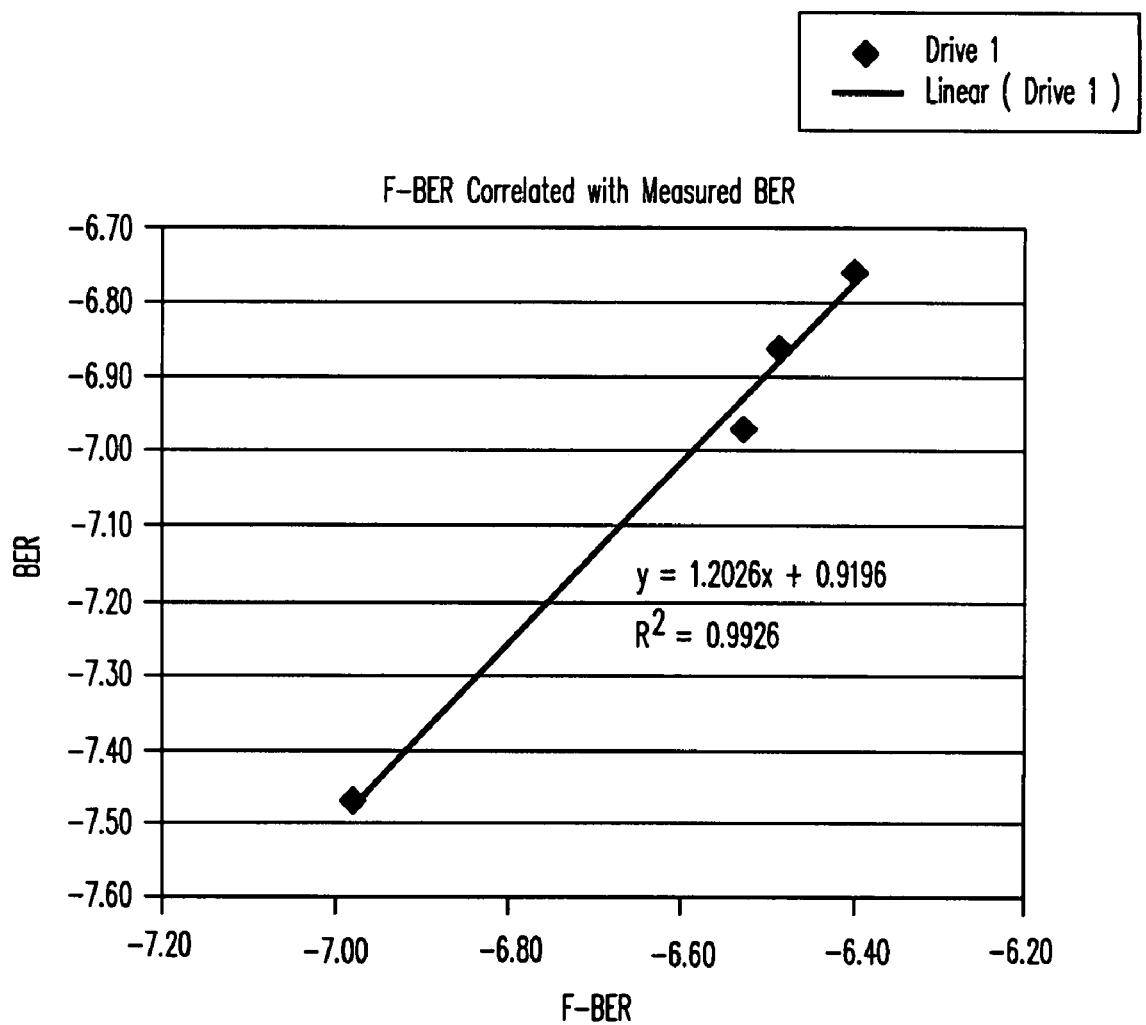
FIGS. 3A and 3B are a chart and a graph demonstrating results of the F-BER method applied to a disk drive.
Figures 4A, 4B:
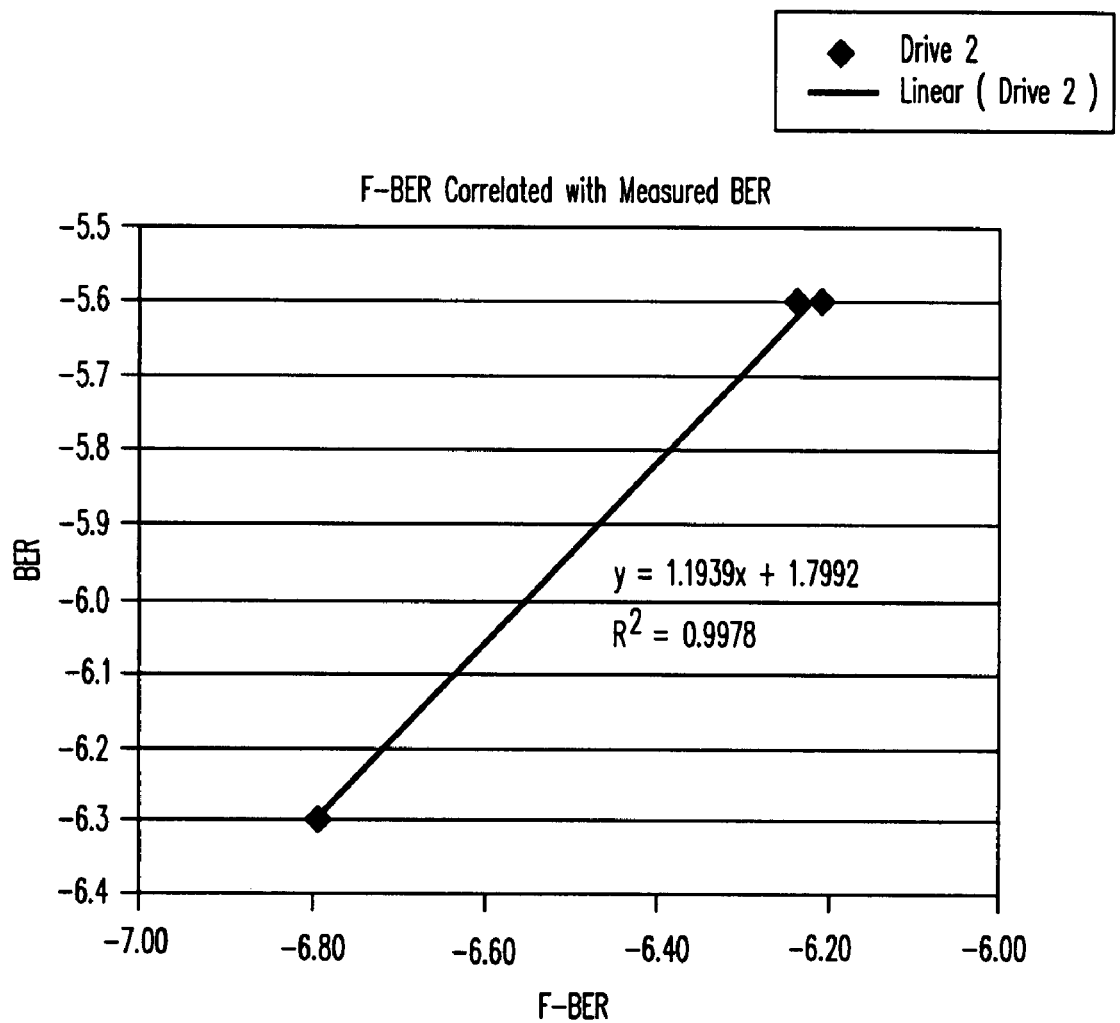
FIGS. 4A and 4B are a chart and a graph demonstrating results of the F-BER method applied to a disk drive.

FIG. 5 shows an exemplary code module in Visual basic to implement the F-BER algorithm. The module may be included in any software designed to run a spin stand tester. The module may also be alone or coupled to other modules capable of providing inputs to compute F-BER.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A disk testing system, comprising:
   a hardware module configured to determine a Functional Byte Error Rate (F-BER) of a disk based on read back signals from a sensor reading the disk and output the F-BER, wherein the output F-BER is usable for at least one of ranking the disk and projecting an error rate performance of a recording system using the disk; and
   a hardware module configured to receive the read back signals from the sensor and wherein the hardware module to determine the F-BER is configured to use the read back signals to determine F-BER,
   wherein the hardware module to receive read back signals is configured to calculate at least a signal at low frequency (LF TAA), media noise (Nm) and a half-peak pulse width (PW50) and the hardware module for determining F-BER is configured to use at least the LF TAA, Nm and PW50 to determine F-BER.

2. The system of claim 1, wherein the hardware module for determining F-BER is configured to use band width (BW) to determine F-BER.

3. The system of claim 2, wherein the F-BER of the disk is determined with the formula F-BER=0.5*[1−erf(ψ)] and wherein $$FOM_0 = (S_0/N_m)^2/(PW50/T);$$

$$FOM_1 = \frac{S_0/(N_m * \sqrt{BW})^2}{a + b*[(PW50/T) - c]^2};$$

$$BW = 1/(2T);$$

$CSNR = 1/\sqrt{d/\pi/FOM_0 + e/FOM_1}$;

$\psi = 0.5*CSNR$;

$S_0$ is a signal at low frequency divided by 2;

$10 \leq a \leq 12$;

$6 \leq b \leq 7$;

$1.75 \leq c \leq 2.25$;

$4.5 \leq d \leq 5$; and $0.4 \leq e \leq 0.8$.

4. The system of claim 3, wherein at least one of a=10.8, b=6.6, c=1.9, d=4.7 and e=0.65.

5. The system of claim 3, wherein the disk is a longitudinal disk.

6. The system of claim 3, wherein the disk is a perpendicular disk.

7. The system of claim 1, wherein the disk is a longitudinal disk.

8. The system of claim 1, wherein the disk is a perpendicular disk.

9. A method for testing a disk, comprising:
receiving read back signals from a sensor;
determining a Functional Byte Error Rate (F-BER) of a disk based on the read back signals from the sensor reading the disk; and
outputting the F-BER,
wherein the step of receiving read back signals includes receiving at least a signal at low frequency (LF TAA), media noise (Nm) and a half-peak pulse width (PW50) and the step of determining F-BER uses at least the LF TAA, Nm and PW50 to determine F-BER.

10. The method of claim 9, wherein the step of determining F-BER uses band width (BW) to determine F-BER.

11. The method of claim 10, wherein the F-BER of the disk is determined with the formula F-BER=0.5*[1−erf($\psi$)] and wherein $FOM_0 = (S_0/N_m)^2/(PW50/T)$;

$$FOM_1 = \frac{S_0/(N_m * \sqrt{BW})^2}{a + b*[(PW50/T) - c]^2};$$

$BW = 1/(2T)$;

$CSNR = 1/\sqrt{d/\pi/FOM_0 + e/FOM_1}$;

$\psi = 0.5*CSNR$;

$S_0$ is a signal at low frequency divided by 2;

$10 \leq a \leq 12$;

$6 \leq b \leq 7$;

$1.75 \leq c \leq 2.25$;

$4.5 \leq d \leq 5$; and $0.4 \leq e \leq 0.8$.

12. The method of claim 11, including at least one of a=10.8, b=6.6, c=1.9, d=4.7 and e=0.65.

13. The method of claim 11, wherein the disk is a longitudinal disk.

14. The method of claim 11, wherein the disk is a perpendicular disk.

15. The method of claim 9, wherein the disk is a longitudinal disk.

16. The method of claim 9, wherein the disk is a perpendicular disk.

17. A disk testing system used in conjunction with a spinstand tester including: a hardware module for determining a Functional Byte Error Rate (F-BER) of a disk; and a hardware module to receive read back signals from a sensor, the read back signals including Low Frequency Track Average Amplitude (LF TAA), media noise (Nm) and half-peak pulse width (PW50), and the hardware module for determining the F-BER is configured to use the read back signals and bandwidth (BW) to determine F-BER with the formula F-BER=0.5*[1−erf($\psi$)] and wherein $FOM_0 = (S_0/N_m)^2/(PW50/T)$;

$$FOM_1 = \frac{S_0/(N_m * \sqrt{BW})^2}{a + b*[(PW50/T) - c]^2};$$

$BW = 1/(2T)$;

$CSNR = 1/\sqrt{d/\pi/FOM_0 + e/FOM_1}$;

$\psi = 0.5*CSNR$;

$S_0$ is a signal at low frequency divided by 2;

$10 \leq a \leq 12$;

$6 \leq b \leq 7$;

$1.75 \leq c \leq 2.25$;

$4.5 \leq d \leq 5$; and $0.4 \leq e \leq 0.8$.

* * * * *